United States Patent
He et al.

(10) Patent No.: US 10,701,524 B2
(45) Date of Patent: Jun. 30, 2020

(54) MULTICAST TRANSMISSION METHOD, INFORMATION EXTRACTION METHOD AND CORRESPONDING TERMINAL AND DEVICE

(71) Applicant: BEIJING QIHOO TECHNOLOGY COMPANY LIMITED, Beijing (CN)

(72) Inventors: Jianqiang He, Beijing (CN); Min Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 188 days.

(21) Appl. No.: 15/740,574

(22) PCT Filed: Jul. 1, 2016

(86) PCT No.: PCT/CN2016/088199
§ 371 (c)(1),
(2) Date: Jun. 25, 2018

(87) PCT Pub. No.: WO2017/000915
PCT Pub. Date: Jan. 5, 2017

(65) Prior Publication Data
US 2018/0302755 A1    Oct. 18, 2018

(30) Foreign Application Priority Data

Jul. 1, 2015 (CN) .......................... 2015 1 0378923

(51) Int. Cl.
*H04W 4/06* (2009.01)
*H04W 84/12* (2009.01)
*H04L 12/18* (2006.01)

(52) U.S. Cl.
CPC ............ *H04W 4/06* (2013.01); *H04L 12/189* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,510,201 B1 * | 11/2016 | Shimoon | H04W 12/06 |
| 2003/0063607 A1 * | 4/2003 | Adachi | H04W 88/04 370/389 |
| 2005/0135284 A1 * | 6/2005 | Nanda | H04W 74/06 370/294 |

(Continued)

*Primary Examiner* — Lonnie V Sweet

(57) ABSTRACT

A multicast transmission method for information to be transmitted and an information extraction method for a multicast data frame are disclosed. The multicast transmission method comprises the steps of: dividing a coding sequence of information to be transmitted into a plurality of code strings, and defining each code string and a corresponding index string allocated thereto and representing an index sequence as a coding unit; constructing a reference frame based on a multicast data frame format; constructing an information frame based on the multicast data frame format, so as to enable a destination address domain thereof to contain the first part content of the coding unit, and enable the difference between the frame length thereof and the frame length of the reference frame to contain the remaining part of the content of the coding unit; and transmitting the reference frame and the information frame.

17 Claims, 6 Drawing Sheets

(56) References Cited

U.S. PATENT DOCUMENTS

| | | | |
|---|---|---|---|
| 2014/0105008 A1* | 4/2014 | Bombacino | H04L 63/105 370/230 |
| 2014/0307581 A1* | 10/2014 | Yoneyama | H04L 49/201 370/254 |
| 2015/0334015 A1* | 11/2015 | Savolainen | H04L 61/25 370/392 |
| 2017/0070418 A1* | 3/2017 | Li | H04L 45/16 |
| 2019/0268847 A1* | 8/2019 | Asterjadhi | H04W 52/0229 |

* cited by examiner

MULTICAST TRANSMISSION METHOD, INFORMATION EXTRACTION METHOD AND CORRESPONDING TERMINAL AND DEVICE

CROSS REFERENCE TO RELATED APPLICATIONS

This application is a national stage application of International Application No. PCT/CN2016/088199 filed on Jul. 1, 2016 which is based upon and claims priority to Chinese Patent Application No. 2015103789215, titled "multicast transmission method, information extraction method and corresponding terminal and device", filed Jul. 1, 2015, the entire contents of which are incorporated herein by reference.

TECHNICAL FIELD

The disclosure relates to the information coding technology, and in particular to an intelligent control terminal and a multicast transmission method for information to be transmitted adopted by the terminal, and an intelligent device and an information extraction method for a multicast data frame adopted by the device.

BACKGROUND

With the development of internet of things, increasing cross occurs between various types of communication access technologies. The early-stage Ad-Hoc (peer to peer) technology based on WiFi implements peer to peer connection between Wireless Fidelity (WiFi) devices. However, the technology can only achieve communication from a single point to a single point and does not include security protection technology, therefore the technology is quickly overturned even replaced by the WiFi. Direct technology although the Ad-Hoc technology is easy to achieve connection. With the WiFi direct technology, any device passed the WiFi direct authentication may operates in an AccessPoint (AP) mode or a Station (STA) mode. In which, interconnection and intercommunication between two or more WiFi devices are achieved by taking a group as unit, and one and only one WiFi device functions as a management center to manage connection of remaining stations in the group in a centralized manner. The WiFi direct technology may be compatible with various encryption modes in the WiFi protocol, therefore it is safer. In addition, the WiFi direction technology has functions of service discovery and base device discovery, therefore convenient using and reliable access are achieved, it is more popular than other technologies and is widely applied at present. By means of these technologies, interconnection between multiple devices can be achieved without an intermediate device such as a router.

A basic and classic application scene of promoting the development of the internet of things is as follows. With the WiFi Direct technology, an intelligent control terminal such as a mobile phone accessed to the internet or a local area network transmits login configuration information of a target network to which the intelligent control terminal has accessed, to another intelligent device sharing a common communication protocol; then, the intelligent device receiving the configuration information logs onto the target network based on the configuration information, thereby accessing to the internet. Since devices related to the internet of things generally have features of being portable, movable and has no function of efficient human-machine interaction and adopt the WiFi access mode, therefore the target network here generally refers to a WiFi access point, i.e., a local area network constructed by WiFi AP (practically, including a more complex WiFi network extended based on the local area network). Therefore, the so-called configuration information is generally identity identification and authentication information for logging onto related AP, including but not limited to Service Set Identifier (SSID) and a password and so on of the AP. The intelligent device can operate normally after accessing to the target network based on the received configuration information by using the WiFi Direct technology.

However, in the existing WiFi Direct technology, the configuration information can be transmitted from the intelligent control terminal to the intelligent device only after a direct connection between the intelligent control terminal and the intelligent device is established. Therefore, the direct connection scheme implemented based on the technology is limited by a direct connection speed. If an accident such as packet loss occurs during the direct connection process, no effective connection can be established, thereby resulting in that the configuration information cannot be transmitted from the intelligent control terminal to the intelligent device.

In view of the technical development process, it is necessary to further develop the data transmission technology for the intelligent device, and promote further development of the internet of things by technical accumulation.

SUMMARY

A first object of the present disclosure is to solve at least one of the above problems. An intelligent control terminal and a multicast transmission method for information to be transmission adopted by the terminal are provided, thereby achieving connection-free transmission of data by means of a multicast data frame.

A second object of the present disclosure is to provide at least one of the above problems. An intelligent device and an information extraction method for a multicast data frame adopted by the device are provided, to obtain the information to be transmitted in response to the first object.

In order to achieve the first object of the present disclosure, the following technical solutions are provided according to the present disclosure.

A multicast transmission method for information to be transmitted is provided according to the present disclosure, which includes:

dividing a coding sequence of information to be transmitted into multiple coding strings, and defining each code string and an index string allocated to the code string indicating an index order as a coding unit;

constructing a reference frame based on a multicast data frame format;

constructing an information frame based on the multicast data frame format, such that a destination address field of the information frame includes a first part of content of the coding unit and a difference of frame lengths of the information frame and the reference frame includes a remaining part of content of the coding unit; and transmitting the reference frame and the information frame.

An intelligent control terminal is provided according to the present disclosure, which includes:

a coding and splitting module configured to divide a coding sequence of information to be transmitted into multiple code strings, and define each code string and an index string allocated to the code string indicating an index order as a coding unit;

a reference frame constructing module configured to construct a reference frame based on a multicast data frame format;

an information frame constructing module configured to construct an information frame based on the multicast data frame format, such that a destination address field of the information frame includes a first part of content of the coding unit, and a difference of frame lengths of the information frame and the reference frame includes a remaining part of content of the coding unit; and a signal transmission module configured to transmit the reference frame and the information frame.

In order to achieve the second object, the following technical solutions are provided according to the present disclosure.

An information extraction method for a multicast data frame is provided according to the present disclosure, which includes:

receiving a reference frame and an information frame constructed based on a multicast data frame format;

extracting, from the information frame, a first part of content of a coding unit expressed by a destination address field of the information frame, and determining a remaining part of content of the coding unit based on a difference of frame lengths of the information frame and the reference frame, to obtain the whole coding unit;

splicing code strings included in all the obtained coding units in an order indicated by index strings of the coding units to generate a coding sequence; and restoring the coding sequence into information.

An intelligent device is provided according to the present disclosure, which includes:

a receiving module configured to receive a reference frame and an information frame constructed based on a multicast data frame format;

an extracting module configured to extract, from the information frame, a first part of content of a coding unit expressed by a destination address field of the information frame, and determine a remaining part of content of the coding unit based on a difference of frame lengths of the information frame and the reference frame, to obtain the whole coding unit;

a constructing module configured to splice code strings included in all the obtained coding units in an order indicated by index strings of the coding units to generate a coding sequence; and a restoring module configured to restore the coding sequence into information.

According to another aspect of the present disclosure, a computer program including computer readable codes is provided, where when the computer readable codes are executed on a computing device, the computing device is caused to perform the multicast transmission method for information to be transmitted or the information extraction method for a multicast data frame.

According to another aspect of the present disclosure, a computer readable medium is provided, which includes the computer program.

As compared with the prior art, the solutions of the present disclosure have the following advantages.

1. In the present disclosure, a multicast data frame is utilized, a destination address field and a difference of frame lengths of different frames in the multicast data frame are used as carriers, a coding sequence corresponding to information to be transmitted is converted into multiple coding units with an index order, and the coding units are loaded to destination address fields of multiple information frames constructed based on the multicast data frame and a difference of frame lengths of each information frame and the reference frame, thereby achieving a technical condition for loading information to be transmitted based on the multicast data frame and performing multicast. Since the multicast data frame can be transmitted without a direct connection between the intelligent control terminal (the transmitting end) and the intelligent device (the receiving end) and without connecting to the same routing device, therefore the transmitting end can radiate a radio signal in the air by taking the multicast data frame as a carrier, to transmit data to the receiving end. Accordingly, after the receiving end receives the corresponding reference frame and information frame, the receiving end, referring to the reference frame, extract multiple coding units of the information to be transmitted from destination address fields of multiple related information frames and the difference of frame lengths of each of the information frames and the reference frame, by using the reverse principle. One coding unit can be extracted for each information frame, the multiple coding units are spliced based on an index order included in the coding units, the coding units are restored into the coding sequence, and the coding sequence is restored into the information to be transmitted, thereby receiving the information to be transmitted by the receiving end.

2. Based on the features of the multicast data frame, the intelligent control terminal may control the destination address field of the multicast data frame locally, and may extend a length of the frame body field. The feature of the multicast data frame structure is utilized in the present disclosure. That is, in a case of transmitting data by utilizing the multicast data frame, not only the destination address field is utilized, but also the difference of lengths of the frame body field of the information frame and the frame body field of the reference frame is utilized, such that a length of content expressed by each multicast data frame is extended, thereby greatly enhancing an information expression capability of the multicast data frame.

The additional aspects and advantages of the present disclosure are given in the following description, which will become obvious from the following description or can be known by practice of the present disclosure.

BRIEF DESCRIPTION OF THE DRAWINGS

The above and/or additional aspects and advantages of the present disclosure will become obvious and easy to be understood according to the following description of embodiments in conjunction with drawings. In the drawings.

DETAILED DESCRIPTION

Figure 1:
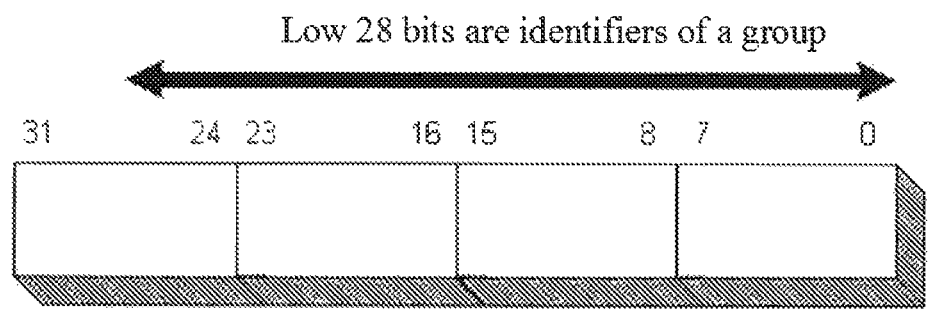
FIG. 1 is a schematic structural diagram of a multicast address according to the present disclosure.

Embodiments of the present disclosure are described in detail hereinafter, and examples of the embodiments are shown in the drawings. Throughout all the drawings, the same or similar signs represent the same or similar elements or elements having the same or similar function. The embodiments described with reference to the drawings below are schematic, and are only used to explain the present disclosure rather than limit the present disclosure.

It should be understood by a person skilled in the art that, unless otherwise defined, a singular form of "a", "an", "the" and "said" used here may refer to plural forms. It should be further understood that, a term "include" used in the specification of the present disclosure refers to existence of the feature, integer, step, operation, element and/or component, and does not exclude existence or adding of one or more other features, integers, steps, operations, elements, components and/or combinations thereof. It should be understood that, an element being "connected" or "coupled" to another element may include that: the element is directly connected or coupled to other elements, or the element is connected to other elements via an intermediate element. In addition, the "connecting" or "coupling" used here may include wireless connection or wireless coupling. The term "and/or" used here refers to all or any of one or more listed associated items or all combinations thereof.

It should be understood by a person skilled in the art that, unless otherwise defined, all terms used here (including technical terms and scientific terms) have the same meaning as that understood generally by a person skilled in the art. It should be further understood that, as the terms defined in a general dictionary, the terms should be understood as the meaning in consistent with the meaning in the context in the prior art; and unless defined particularly here, otherwise the terms should not be explained as idealized or too form meanings.

It should be understood by a personal skilled in the art that, "terminal", "terminal device", "intelligent device" and "intelligent control terminal" used here include: a device including a wireless signal receiver, a device including a wireless signal receiver with only a wireless transmitting capability, and a device including receiving and transmitting hardware which can perform bi-directional communication on a bi-directional communication link. The device may include: a cellular device or other communication device, such as cellular or other communication device with a single-line display or a multi-line display or without a multi-line display; Personal Communications Service (PCS), which may combine voice, data processing, fax and/or data communication capabilities; Personal Digital Assistant (PDA), which may include a radio frequency receiver, a pager, internet/internal networking access, a network browser, a notebook, a calendar and/or a global positioning system (GPS) receiver; a conventional lap-top and/or handheld computer or other device, which includes a conventional lap-top and/or handheld computer or other device having and/or including a radio frequency receiver. The various "terminals" used here may be portable, transportable, and mounted on a vehicle (aviation, shipping and/or land), or adapts and/or is configured to operate locally, and/or operate any other position of the earth and/or space in a distributed form. The various "terminal" used here may be a communication terminal, an internet terminal and a music/video playing terminal, such as a PDA, a mobile internet device (MID) and/or a mobile phone with a function of playing music/video, or may be an intelligent television, a set top box, an intelligent camera, an intelligent remote controller, and an intelligent socket and so on.

In the present disclosure, technology for coding and decoding is disclosed in detail by taking a multicast data frame as a carrier, such that a person skilled in the art can implement the present disclosure according to the specification without creative work. In order to facilitate understanding by a person skilled in the art, two corresponding methods are provided in the present disclosure. One is a multicast transmission method for information to be transmitted, in which, information to be transmitted is loaded and sent by coding. The other is an information extraction method for a multicast data frame, in which, the transmitted information is extracted by decoding. With such system, the process of coding, transmitting, receiving, decoding and restoring for information is performed.

Since the method involves the utilization of multicast data frame according to the present disclosure comply with standards of the 802.11 protocol, it is necessary to know basic knowledge of a physical frame (a MAC frame) defined in the 802.11 protocol.

TABLE 1

| 802.11 protocol family MAC frame structure (a unit for a first row is byte) | | | | | | | | |
|---|---|---|---|---|---|---|---|---|
| 2 | 2 | 6 | 6 | 6 | 2 | 6 | 0-2312 | 4 |
| Frame Control | Duration | Address 1 | Address 2 | Address 3 | Seq Ctrl | Address 4 | Frame Body | Check Sum |

Various fields involved in table 1 are illustrated in the following.

Frame control indicates a frame control field;

Duration/ID indicates occupation time of a channel by a frame and its acknowledgement frame; and for a frame of which a frame control field sub type is Power Save-Poll, the Duration/ID indicates an association identification (AID) of STA;

Address Fields (1-4) indicate an address field and include four addresses (a source address, a destination address, a sender address and a receiver address and depend on bits To DS and From DS in the frame control field;

Seq Ctrl, i.e., Sequence Control, is a sequence control d and is for filtering repeating frames;

Frame Body is a frame body field or a data field and is for indicating transmitted information or received information; and Check Sum is a check field and includes 32 bits of cyclic redundancy check (CRC).

TABLE 2

| Frame Control structure a unit for a first row is byte) | | | | | | | | | | |
|---|---|---|---|---|---|---|---|---|---|---|
| 2 | 2 | 4 | 1 | 1 | 1 | 1 | 1 | 1 | 1 | 1 |
| Version | Type | Sub-type | To DS | From DS | MF | Retry | Pwr | More | W | O |

Various fields involved in table 2 are illustrated in the following.

Protocol Version indicates a version of the IEEE 802.11 standard;

Type indicates a frame type, including management, control and data and so on;

Subtype indicates a sub type of a frame, such as an authentication frame, a deauthentication frame, an association request frame, an association response frame, a reassociation request frame, a reassociation response frame, a disassociation frame, a beacon frame, a probe frame, a probe request frame or a probe response frame;

To DS is set as 1 when a frame is transmitted to a distribution system (DS);

From DS is set as 1 when a frame is received from a distribution system (DS);

MF, i.e., More Fragment, is set as 1 when more segments belong to the same frame;

Retry indicates the segment is a retransmission frame of a segment transmitted previously;

Pwr, i.e., Power Management, indicates a power supply management mode adopted by a station after the frame is transmitted;

More, i.e., More Data, indicates that many frames are cached in the station;

W, i.e., WEP, indicates encrypting a frame body according to a wired equivalent privacy (WEP) algorithm; and O, i.e., order 1, indicates that the receiver should process the frame strictly in an order.

It may be known from table 2 that, a position where a destination address field of the multicast data frame is located can be determined based on fields From DS and To DS, Reference is made to table 3.

TABLE 3

Using method of the address field in the data frame

| Function | To DS | From DS | Address 1 (receiving end) | Address 2 (transmitting end) | Address 3 | Address 4 |
| --- | --- | --- | --- | --- | --- | --- |
| IBSS | 0 | 0 | DA | SA | BSSID | unused |
| To AP (basic structure | 1 | 0 | BSSID | SA | DA | unused |
| From AP (basic structure | 0 | 1 | DA | BSSID | SA | unused |
| WDS(wireless distribution system) | 1 | 1 | RA | TA | DA | SA |

It should be known by those skilled in the art that, IP address spaces are classified into three types: A, B and C. A fourth type, i.e., D type, of address is reserved to function as a multicast address. In the IP protocol of a fourth version (IPv4), all IP addresses from 224.0.0.0 to 239.255.255.255 are D type of addresses.

The most important multicast addresses are addresses of four bits, i.e., from a 24-th to a 27-th, corresponding to from 224 to 239 in decimal, and the remaining 28 bits are reserved to function as a group identifier for multicast, as shown in FIG. 1.

In a network layer, a multicast address of IPv4 is to be converted into a network physical address. For a unicast network address, a physical address corresponding to the IP address may be acquired according to the ARP protocol. However, in a multicast mode, the ARP protocol cannot achieve similar functions, and the physical address has to be acquired by other methods. A method for performing the conversion process is provided in a RFC document listed in the following.

RFC1112: Multicast IPv4 to Ethernet physical address correspondence

RFC1390: Correspondence to FDDI

RFC1469: Correspondence to Token-Ring networks

Figure 2:
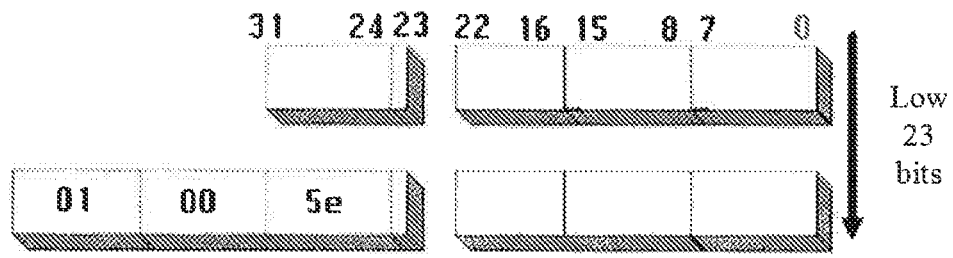
FIG. 2 is a schematic diagram showing a mapping relationship of multicast addresses and IP addresses according to the present disclosure.

In a maximum range of an Ethernet network address, the conversion process is as follows: previous 24 bits of the Ethernet network address are fixed as 01:00:5E, which are the most identifier bits. An immediately adjacent bit is fixed as 0, and the remaining 23 bits are filled with low 23 bits of the IPv4 multicast address. The conversion process is shown in FIG. 2. For example, a multicast address is 224.0.0.5, and a corresponding Ethernet network physical address is 01:00:5E:00:00:05. It may be seen that, low 23 bits (or fewer bits) of the destination address field here may function as an editable bit region for loading information.

In addition, a length of content of a frame body field, i.e., Frame Body, is variable, and specific content stored in the frame body field depends on a frame type and a sub type.

In a case that the terminal device is not connected to a WiFi access point, a WiFi chip may detect a radio frequency signal in a space and identify a MAC frame. In this case, the device is authenticated by the access point without a secret key, data of the frame body field in a frame structure cannot be further analyzed. A length of the frame body field is known, and thus a length of the whole multicast data frame is also known. Therefore, utilization of the frame length of the multicast data frame is not influenced by the feature. Hence, in the present disclosure, with the fields, the intelligent device can receive information transmitted by the intelligent control terminal via multicast in a case of not connecting to the network. Actually, it can be known according to standards of the 802.11 protocol that, for a multicast data frame, its length depends on only a length of a frame body field of the multicast data frame.

It may be seen according to the content disclosed above that, for a multicast data frame, the destination address field in the frame structure and the variable length of the frame body field may be used for loading information to be transmitted. The content disclosed above is a base for knowing practice of the present disclosure, and the method according to the present disclosure is disclosed based on the above-disclosed content in the following.

A multicast transmission method for information to be transmitted is provided according to the present disclosure, which is described from an angle of an active initiator or a central control party. The method may be implemented as computer programs by programming, and the computer programs are installed in a mobile phone, a tablet computer or an intelligent control terminal for operating, for example, installing APP implemented by the transmission method on a mobile phone or a tablet computer running Android, IOS or Windows phone system. The APP performs the transmission method.

Figure 3:
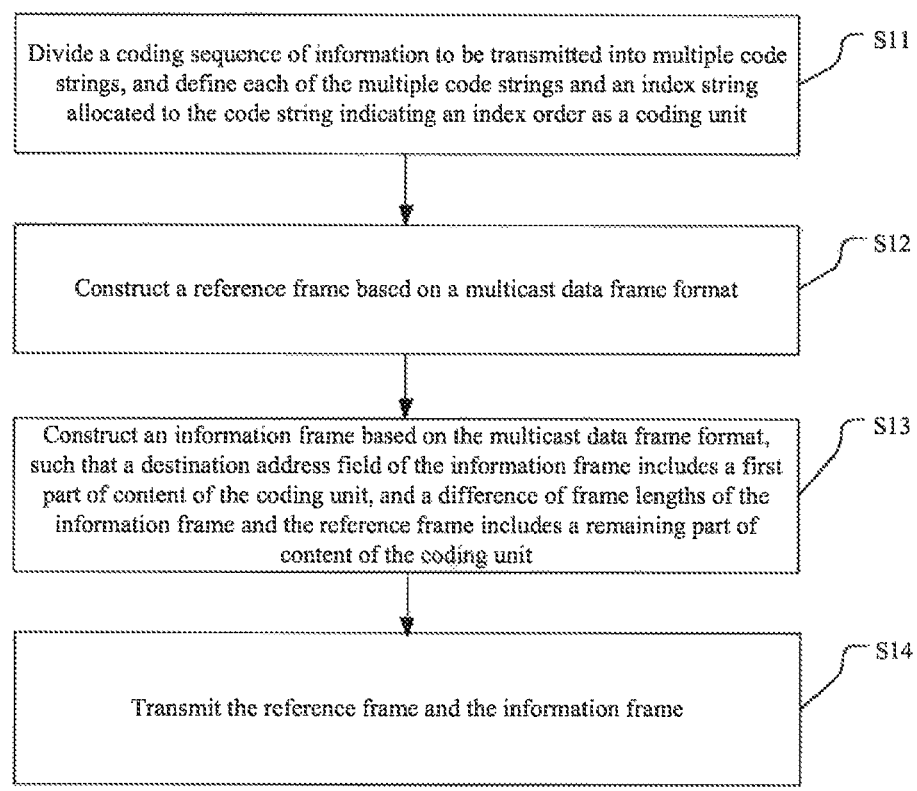
FIG. 3 is a schematic diagram showing a principle of a multicast transmission method for information to be transmitted according to the present disclosure.

Reference is made to FIG. 3 which is a typical embodiment of the multicast transmission method for information to be transmitted according to the present disclosure. The method includes step S11 to step S14 in the following.

In step S11, a coding sequence of information to be transmitted is divided into multiple code strings, and each code string and an index string allocated to the code string indicating an index order are defined as a coding unit.

In an application scene, the information to be transmitted may be information for providing a service set identifier (SSID) and a password of a WiFi access point, or other information with a small data volume, such as authentication information.

The information to be transmitted is analyzed into a coding sequence consisting of machine binary codes before being coded. In order to make the information to be transmitted safer, the information to be transmitted is encrypted to generate a cipher text, and then is converted into the described coding sequence. The encryption may be performed by using a public key or a symmetric secret key, as long as a receiving end can decrypt by using a corresponding secret key (such as a private key in the public key encryption or the same key in the symmetric encryption). Whether in an encrypted state or a public state, the information to be transmitted is coded after being analyzed into binary codes, such that the information to be transmitted is suitable to be allocated to multicast data frames.

Firstly, the coding sequence of the information to be transmitted is divided into multiple code strings, each code string forms a relatively independent part without information meaning. The code strings have the same length, for example occupying 20 bits. Then, an index string is allocated for each code string, and the code string is expressed by binary similarly, for example occupying 6 bits. In a format of 6 bits, $2^6$ groups of code strings can be expressed. Then, an index string is combined with each code string, an inherent order of the code strings may be expressed by values of the index strings. That is, the code strings generated by dividing the coding sequence are allocated with index strings having corresponding values according to the concatenation order, such that the index string may be used to express an index order corresponding to the respective code string. In this way, the whole coding sequence is split and ranked. For facilitating description, each index string and a code string combined with the index string are defined as a coding unit, the information to be transmitted is divided into multiple coding units which are relatively independent from each other, and the coding units have an order. It should be noted that, the coding unit itself is a combination concept rather than a concept with a fixed order. In order to utilize the multicast data frame, the total length of the coding unit is 26 bits, the index string occupies a first length, totally 6 bits, and the corresponding code string occupies a second length, i.e., the remaining 20 bits, and the total length of the coding unit is just a sum of the first length and the second length. Apparently, all coding units have the same total length.

After the information to be transmitted is divided into multiple coding units, subsequent coding can be performed based on the multicast data frame.

In step S12, a reference frame is constructed based on a multicast data frame format.

The reference frame may be constructed flexibly. According to the multicast data frame and the structure of the multicast data frame disclosed above, an editable bit region in a destination address field of the reference frame, i.e., low 23 bits, or bits in other specific bit sequence, each are set as 0 or 1, and a length of a frame body of the reference frame is determined as a reference length. Based on this, as long as a receiving party of the reference frame can comply with the standards of the present disclosure, the reference frame can be identified according to the coding principle for the reference frame here, and the length of the frame body field can be determined as the basic length. Alternatively, the length of the whole reference frame depends on the length of the frame body field, therefore the total length of the reference frame may be directly determined as the basic length. The basic length is less than a frame length of a subsequent information frame, such that information coding is determined based on a difference of frame lengths. Similarly, alternatively, the frame length of the reference frame may be greater than the frame length of the subsequent information frame.

In step S13, an information frame is constructed based on the multicast data frame format, such that a destination address field of the information frame includes a first part of content of the coding unit, and a difference of frame lengths of the information frame and the reference frame includes a remaining part of content of the coding unit.

The difference of frame lengths of the information frame and the reference frame is utilized in the present disclosure, therefore a changing range of the difference may be specified, such that the difference of the frame lengths of the information frame and the reference frame is maintained within a specific range, for example the changing range of the difference is at most 8. In a computer, 3 bits of binary, i.e., 000 to 111, may be used to express different differences. When the 3 bits of binary, i.e., 000 to 111 are in combination with the low 23 bits of the destination address field described above, an expression capability of 26 bits can be achieved. In which, an index string of 6 bits can express 64 groups of data, the remaining 20 bits in each frame can express a data volume of 2.5 Bytes, and an information volume of 160 Bytes can be expressed in one-time coding.

Similarly, the information frame is also constructed based on the multicast data frame. The construction of the information frame includes: coding each coding unit into an information frame. Several coding modes between each coding unit and the information frame are described briefly hereinafter.

A First Coding Mode

A code string included in the coding unit is divided into two parts: a first sub code string and a second sub code string. It is assumed that the first sub code string occupies 17 bits, and the second sub code string just occupies all 3 bits of the difference. An index string in the coding unit is concatenated prior to the first sub code string of each code string, therefore a splicing body of the index string and the first sub code string occupies 23 bits, just equivalent to the editable bit region of 23 bits provided by the multicast data frame, and the splicing body is expressed in the editable bit region. The second sub code string is assumed as 010 representing a value 2 in decimal. The length of the frame body field of the information frame is determined, such that the frame length of the information frame is greater (which may be less in other embodiments) than the frame length of the reference frame (the reference length), i.e., 2 Bytes, thereby achieving coding expression. A subsequent receiving party subtracts the frame length of the reference frame from the frame length of the information frame, to obtain the second sub code string 010.

A Second Coding Mode

The second coding mode differs from the first coding mode only in that: the object to be split is an index string rather than a code string in the coding unit. In the data according to the above example, the total length of the code string is 20 bits, and the code string can be fully expressed in the editable bit region of the multicast data frame. Therefore, in this case, the editable bit region can only express 3 bits in the index string, i.e., a first sub index string, and remaining 3 bits in the index string, i.e., a second sub index string, can only be expressed in the difference of the frame lengths of the information frame and the reference frame with reference to the first coding mode.

In the examples of the two coding modes above, a collocation relation between the index string of 6 bits, the code string of 20 bits, the low 23 bits of the destination address field and the frame length difference of 3 bits is preferable, such that not only an information expression capability of the multicast data frame can be enhanced as much as possible, but also a risk of information transmission failure due to UDP data packet loss during the transmission process can be reduced.

A Third Coding Mode

In the third coding mode, the code string in the coding unit is directly expressed in a destination address field of an information frame to which the code string belongs, for example, occupying low 20 bits of the destination address field, and the index string is expressed in a difference of frame lengths of an information frame to which the index string belongs and the reference frame. If a length of the index string is maintained as 6 bits as in the above example, a range of the difference of the frame lengths of the information frame and the reference frame should be maintained in a maximum range which can be expressed by binary codes of 6 bits. If the bits of the index string are reduced to 3 bits and the code string is extended to 23 bits such that the code string occupies the whole editable region of the destination address field, the information expression capability is weaker than that in the above example since the index string can only express 8 groups of data.

A Fourth Coding Mode

Similar to the third coding mode, the index string in the coding unit may be expressed in a destination address field of an information frame to which the index string belongs, for example occupying low 23 bits of the destination address field, and the code string is fully expressed in the difference of frame lengths of an information frame to which the code string belongs and the reference frame. If the length of the code string is maintained as 20 bits in the above example, a range of the difference of the frame lengths of the information frame and the reference frame should be maintained as a maximum range which can be expressed by binary codes of corresponding 20 bits similarly. If the bits in the code string are reduced to 3 bits described in the above example, an information volume expressed by a single code string is limited; and the index string has 23 bits, and thus multiple multicast data frames are to be constructed to transmit the same information. It follows that, the first and second coding modes are superior to the third and fourth coding modes.

According to the four coding modes described above, it can be known that for the finally constructed information frame, whose destination address field particularly refers to the editable bit region in the field, includes a first part content of the coding unit. The first part of content may be all or a part of sub code strings of the code string, or may be all or a part of sub index strings of the index string. The length of the frame body field is adjusted, such that a difference of frame lengths of the information frame and the reference frame is within a specific range. A binary format of the difference includes a remaining part of content in the coding unit which is not coded into the destination address field, and the type and the number of the remaining part of content depends on the type and the number of expression of the destination address field. The remaining part of content may be sub code strings in a remaining part of the code string, may be the whole code string, or may be the whole index string or a remaining part of the index string. In summary, the code string and the index string included in the same coding unit can be expressed separately in the editable bit region of the destination address field of the same information frame and in the difference of frame lengths of the information frame and the reference frame as needed, thereby constructing the information frame.

In step S14, the reference frame and the information frame are transmitted,

The reference frame and the information frame are constructed, and thus all coding of the information to be transmitted is completed. In this case, a corresponding interface is called, and the reference frame and the information frame can be radiated in the air in a wireless manner to transmit to a receiving end, by using a WiFi communication component based on the 802.11 protocol. It should be noted that, since the upper layer protocol is UDP, the reference frame and the information frame are transmitted in a form of UDP data packets. The UDP protocol is unreliable, therefore 10 times of cycle are set when the reference frame and the information frame are to be transmitted according to the method. In each cycle, the reference frame and the information frame are transmitted sequentially in an index order indicated by the index string (the reference frame is regarded as coding into 0 and ranking first), such that the receiving end receives all the multicast data frames smoothly. However, the reference frame and the information frame may be transmitted out of order in the same cycle, which does not influence an implementation result of the present disclosure. It should be noted that, the number of times of cycle during the transmission is not limited, which may be 5, 20 or other numbers.

It can be seen that, with the multicast transmission method for the information to be transmitted described above, the coding process is simple, the information expression capability is strong, and the information can be transmitted without establishing a stable connection between intelligent devices.

Accordingly, at another end corresponding to the intelligent control terminal, a controlled intelligent device is generally provided, such as an intelligent camera, an automobile data recorder and an intelligent watch and so on. The controlled intelligent device is generally to complete its own configuration based on the information to be transmitted described above, so as to access to an external network. In order to receive the information described above, the controlled intelligent device needs to have a function of decoding the multicast data frame constructed by the coding process described above, to perform subsequent operations.

Figure 4:
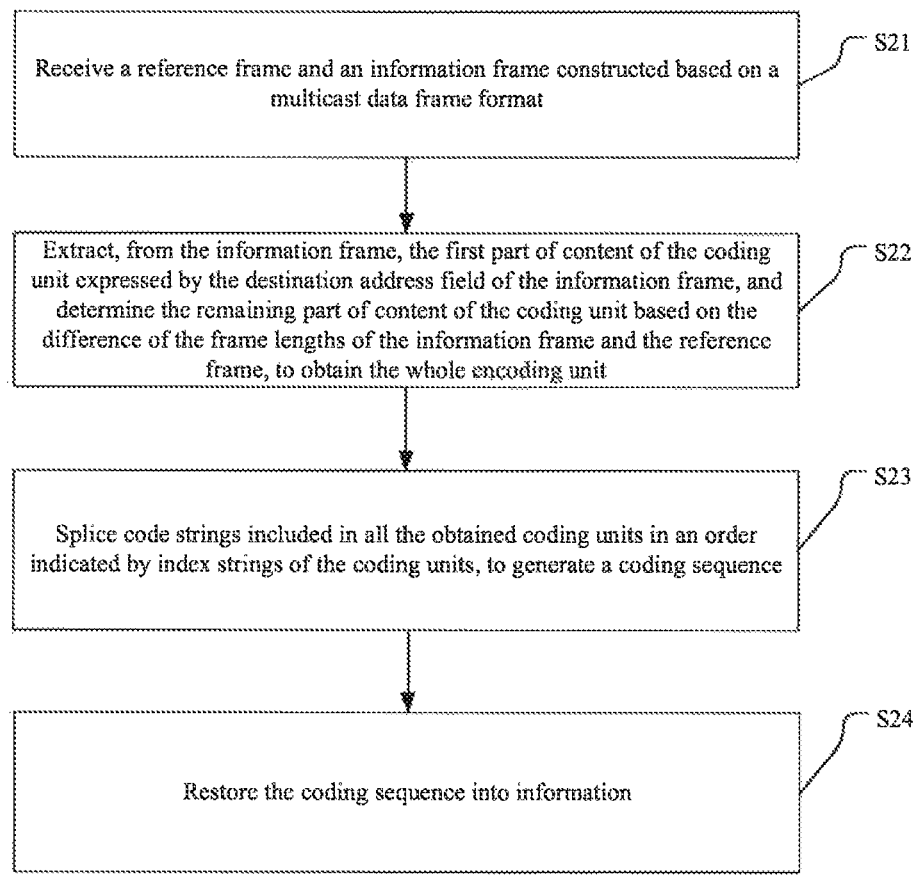
FIG. 4 is a schematic diagram showing a principle of an information extraction method for a multicast data frame according to the present disclosure.

Reference is made to FIG. 4 which shows an information extraction method for a multicast data frame applied to an intelligent device side according to the present disclosure. The method includes steps S21 to S24 in the following.

In step S21, a reference frame and an information frame constructed based on a multicast data frame format are received.

The intelligent device receives UDP data packets in the air via a WiFi communication module complying with the 802.11 standard to obtain a corresponding multicast data frame, and then decodes the multicast data frame to obtain information loaded in the multicast data frame.

The reference frame and the information frame are constructed according to a specific coding principle, therefore decoding is to be performed according to a principle corresponding to the coding principle. The decoding party and the coding party in the present disclosure each should comply with the same set of self-defined protocols specified in the present disclosure. In view of this, with the method described above, the reference frame and the information frame are acquired according to the following steps in the present method.

In step S211, a multicast data frame is received. A UDP data packet radiated in the air in a wireless manner is acquired via a WiFi communication module, to obtain a multicast data frame of the UDP data packet, and a type of the multicast data frame is identified.

In step S212, it is determined whether the multicast data frame is the reference frame. Specifically, according to the self-defined protocol to be complied by the method, it is checked whether an editable bit region of a destination address field of the multicast data frame complies with standards of the protocol. For example, in the above method, 23 bits defined each are 0 or 1. Further, it is checked whether a frame length of the multicast data frame meets data specified in the protocol. Since the frame length of the multicast data frame depends on only a length of a frame body field, it may also be checked whether the length of the frame body field meets data specified in the protocol. If one or all of the conditions meet the standards of the self-defined protocol, the multicast data frame is determined as the reference frame; otherwise, the packet may be discarded temporarily.

In step S213, when the multicast data frame is determined as the reference frame in step S212, it is indicated that remaining parts of the currently received series of multicast data frames include information frames. Therefore, it starts to receive remaining multicast data frames, i.e., the information frame. The transmitting party sends the reference frame and the information frame for multiple times, therefore in step S213, when the reference frame is determined, all of the remaining multicast data frames may be received, and repeated multicast data frames may be discarded, thereby obtaining the reference frame and non-repeated information frames finally. Theoretically, in the above embodiment, since the index string has 6 bits, a sum of bits of the reference frame and the information frame should be 64, which depends on bits of the index string. Further, it can be checked whether all non-repeated information frames and the reference frame are received according to the number of data sets and an order indicated by the index string, and the remaining frames are discarded. Further, it can be determined whether the information frame is an information frame loading the information to be transmitted defined in the present disclosure by checking whether a difference of frame lengths of the information frame and the reference frame exceeds a predetermined specific range. Therefore, in step S213, a frame cheek process is performed substantially. In addition, corresponding to several different examples of the above method, the frame length of the information frame is obviously greater or less than the frame length of the reference frame (specified by the self-defined protocol), that is, the frame length of the reference frame is less than or greater than the frame length of the information frame, therefore it can be checked whether the multicast data frame is the information frame complying with standards of the self-defined protocol based on the feature.

It follows that, by the above sub steps, all the reference frames and information frames transmitted by the transmitting party can be received.

In step S22, a first part of content of a coding unit expressed by a destination address field of the information frame is extracted from the information frame, and a remaining part of content of the coding unit is determined based on a difference of frame lengths of the information frame and the reference frame, to obtain the whole coding unit.

The essence of step S22 is to perform a part of decoding process, so as to acquire the relatively independent coding unit in each information frame.

A receiving party needs to comply with the coding principle of the transmitting party. Therefore, corresponding to the four coding modes in the above method, the received information frame is decoded according to the following modes.

A First Decoding Mode

An index string (previous 6 bits) and a first sub code string of a code string (last 17 bits) are extracted from an editable bit region of the destination address field of the information frame, i.e., lower 23 bits of the destination address field. Then, a binary difference (3 bits) of frame lengths (or frame body field lengths) of the information frame and the reference frame, i.e., a second sub code string, is calculated. The first sub code string is concatenated with the second sub code string to form the code string, and the index string is used to determine a splicing order of code strings according to an order indicated by the index string. The obtained code string and index string form the coding unit loaded in the information frame.

A Second Decoding Mode

Similarly, a whole code string (low 20 bits) and a first sub index string of an index string (previous 3 bits of an editable bit region) are extracted from an editable bit region of a destination address field of the information frame, i.e., lower 23 bits of the destination address field. A second sub index string of the index string is determined based on a binary difference (3 bits) of frame lengths (or frame body lengths) of the information frame and the reference frame. The first sub index string is spliced with the second sub index string to obtain the whole index string. The index string and the code string form the coding unit expressed by the information frame.

A Third Decoding Mode

The editable bit region of the destination address field of the information frame, totally 23 bits, is directly extracted to obtain the code string. The index string is determined as a binary difference (3 bits or more) of frame lengths (or frame body lengths) of the information frame and the reference frame. The index string and the code string form the corresponding coding unit.

A Fourth Decoding Mode

Similar to third decoding mode, the editable bit region of the destination address field of the information frame, totally 23 bits, is directly extracted to obtain the index string. The code string is directly determined as a binary difference (3 bits or more) of frame lengths (or frame body lengths) of the information frame and the reference frame. The index string and the code string form the corresponding coding unit.

It follows that, in step S22, a protocol corresponding to the coding process should be complied regardless of the details. Specifically, a first part of content of the coding unit expressed by the destination address field of the information frame is extracted from the information frame, and a remaining part of content of the coding unit is determined based on a difference of frame lengths (a binary format of a defined length) of the information frame and the reference frame, thereby obtaining the whole coding unit.

When all the information frames are decoded into the coding units, primary decoding for the whole information is completed. Subsequently, the splicing and restoring are performed to obtain the corresponding information.

In step S23, code strings included in all the obtained coding units are spliced in an order indicated by index strings of the coding units to generate a coding sequence.

Each coding unit has an index string indicating its own order, and the index string indicates a position of a code string included in the coding unit in the split coding sequence. Therefore, code strings included in the coding units are spliced in an order indicated by the index strings, to restore a corresponding coding sequence, thereby restoring the information to be transmitted.

In step S24, the coding sequence is restored into information.

As described above, if the coding sequence is obtained by converting a cipher text which is generated by encrypting information, the coding sequence is to be restored into the cipher text firstly, and then the cipher text is decrypted with a pre-stored secret key to obtain the transmitted information. A type of the secret key is determined depending on whether the encryption technology is public key encryption or symmetric encryption. For the public key encryption, a pre-stored secret key corresponding to the public key for the coding is used to decrypt. For the symmetric encryption, a pre-stored secret key the same as the secret key for the coding is used to decrypt. Practically, the processing is unnecessary if the coding sequence is obtained by converting non-encrypted information.

Further, for the information, during the coding process, multiple information elements are combined according to a certain format and converted to a coding sequence. For example, it is assumed that content formed by performing ASCII conversion on the restored information is as follows:

SSID:MYWiFi|PSW:PLZLOGIN.

It can be seen that, SSID and PSW indicate types of information elements, MYWiFi and PLZLOGIN indicates specific content of the information elements, an attribute separator, i.e., ":", is used to separate the type identifier from the specific content, and an element separator "|" is used to separate different information elements. According to the above principle, the intelligent control terminal and the intelligent device can convert and interpret information based on the standards of the self-defined protocol, such that the intelligent device can configure its network setting and access to a network.

It should be noted that, step S21 and step S22 are not limited to be performed in the order after all tasks are completed, and the two steps may be performed sequentially for each received information frame. Therefore, the two steps may be performed in parallel, that is, step S21 and step S22 each are performed for each information frame, instead of performing step S22 for all information frames after performing step S21 for all information frames. A person skilled in the art should know the mechanism.

It follows that, corresponding to the above method, with the information extraction method fir the multicast data frame, information loaded by the multicast data frame can be extracted by simple steps without establishing a stable connection between the receiving party and the transmitting party.

Further, based on modular thought, an intelligent control terminal is provided according to the present disclosure. Preferably, the intelligent control terminal is a mobile phone installing with the corresponding APP described above.

Figure 5:
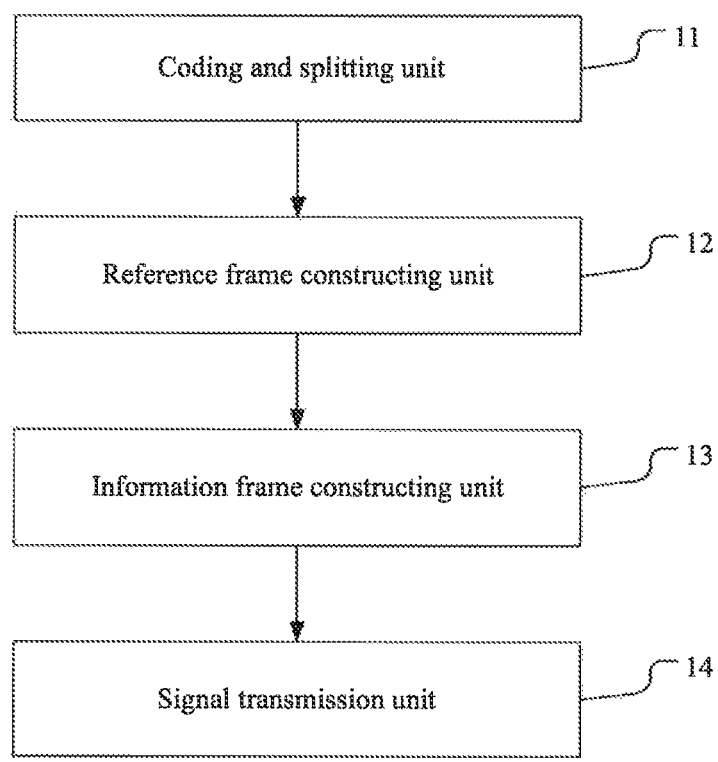
FIG. 5 is a schematic structural diagram of an intelligent control terminal according to the present disclosure.

Referring to FIG. 5, the intelligent control terminal according to the present disclosure includes: a coding and splitting module 11, a reference frame constructing module 12, an information frame constructing module 13 and a signal transmission module 14. Functions of the modules are described in detail hereinafter.

The coding and splitting module 11 is configured to divide a coding sequence of information to be transmitted into multiple code strings, and each of the multiple code strings and an index string allocated to the code string indicating an index order are defined as a coding unit.

In an application scene, the information to be transmitted may be information for providing a service set identifier (SSID) and a password of a WiFi access point, or other information with a small data volume, such as authentication information.

The information to be transmitted is analyzed into a coding sequence consisting of machine binary codes before being coded. In order to make the information to be transmitted safer, the information to be transmitted is encrypted to generate a cipher text, and then is converted into the described coding sequence. The encryption may be performed by using a public key or a symmetric secret key, as long as a receiving end can decrypt by using a corresponding secret key (such as a private key in the public key encryption or the same key in the symmetric encryption). Whether in an encrypted state or a public state, the information to be transmitted is coded after being analyzed into binary codes, such that the information to be transmitted is suitable to be allocated to multicast data frames.

Firstly, the coding sequence of the information to be transmitted is divided into multiple code strings, each code string forms a relatively independent part without information meaning. The code strings have the same length, for example occupying 20 bits. Then, an index string is allocated for each code string, and the code string is expressed by binary similarly, for example occupying 6 bits. In a format of 6 bits, $2^6$ groups of code strings can be expressed. An index string is combined with each code string, an inherent order of the code strings may be expressed by values of the index strings. That is, the code strings generated by dividing the coding sequence are allocated with index strings having corresponding values according to the concatenation order, such that the index string may be used to express an index order corresponding to the respective code string. In this way, the whole coding sequence is split and ranked. For facilitating description, each index string and a code string combined with the index string are defined as a coding unit, the information to be transmitted is divided into multiple coding units which are relatively independent from each other, and the coding units have an order. It should be noted that, the coding unit itself is a combination concept rather than a concept with a fixed order. In order to utilize the multicast data frame, the total length of the coding unit is 26 bits, the index string occupies a first length, totally 6 bits, and the corresponding code string occupies a second length, i.e., the remaining 20 bits, and the total length of the coding unit is just a sum of the first length and the second length. Apparently, all coding units have the same total length.

After the information to be transmitted is divided into multiple coding units by the coding and splitting module 11, subsequent coding can be performed based on the multicast data frame.

The reference frame constructing module 12 is configured to construct a reference frame based on a multicast data frame format.

The reference frame may be constructed flexibly. According to the multicast data frame and the structure of the multicast data frame disclosed above, an editable bit region in a destination address field of the reference frame, i.e., low 23 bits, or bits in other specific bit sequence, each are set as 0 or 1, and a length of a frame body of the reference frame is determined as a reference length. Based on this, as long as a receiving party of the reference frame can comply with the standards of the present disclosure, the reference frame can be identified according to the coding principle for the reference frame here, and the length of the frame body field can be determined as the basic length. Alternatively, the length of the whole reference frame depends on the length of the frame body field, therefore the total length of the reference frame may be directly determined as the basic length. The basic length is less than a frame length of a subsequent information frame, such that information coding is determined based on a difference of frame lengths. Similarly, alternatively, the frame length of the reference frame may be greater than the frame length of the subsequent information frame.

The information frame constructing module 13 is configured to construct an information frame based on the multicast data frame format, such that a destination address field of the information frame includes a first part of content of the coding unit, and a difference of frame lengths of the information frame and the reference frame includes a remaining part of content of the coding unit.

The difference of frame lengths of the information frame and the reference frame is utilized in the present disclosure, therefore a changing range of the difference may be specified, such that the difference of the frame lengths of the information frame and the reference frame is maintained within a specific range, for example the change range of the difference is at most 8. In a computer, 3 bits of binary, i.e., 000 to 111, may be used to express different differences. When the 3 bits are in combination with the low 23 bits of the destination address field described above, an expression capability of 26 bits can be achieved. In which, an index string of 6 bits can express 64 groups of data, the remaining 20 bits in each frame can express a data volume of 2.5 Bytes, and an information volume of 160 Bytes can be expressed in one-time coding.

Similarly, the information frame is also constructed based on the multicast data frame. The construction of the information frame includes: coding each coding unit into an information frame. Several coding modes between each coding unit and the information frame structure are described briefly hereinafter.

A First Coding Mode

A code string included in the coding unit is divided into two parts: a first sub code string and a second sub code string. It is assumed that the first sub code string occupies 17 bits, and the second sub code string just occupies all 3 bits of the difference. An index string in the coding unit is concatenated prior to the first sub code string of each code string, therefore a splicing body of the index string and the first sub code string occupies 23 bits, just equivalent to the editable bit region of 23 bits provided by the multicast data frame, and the splicing body is expressed in the editable bit region. The second sub code string is assumed as 010 representing a value 2 in decimal. The length of the frame body field of the information frame is determined, such that the frame length of the information frame is greater (which may be less in other embodiments) than the frame length of the reference frame (the reference length), i.e., 2 Bytes, thereby achieving coding expression. A subsequent receiving party subtracts the frame length of the reference frame from the frame length of the information frame, to obtain the second sub code string 010.

A Second Coding Mode

The second coding mode differs from the first coding mode only in that: the object to be split is an index string rather than a code string in the coding unit. In the data according to the above example, the total length of the code string is 20 bits, and the code string can be fully expressed in the editable bit region of the multicast data frame. Therefore, in this case, the editable bit region can only express 3 bits of the index string, i.e., a first sub index string, and remaining 3 bits in the index string, i.e., a second sub index string, can only be expressed in the difference of the frame lengths of the information frame and the reference frame with reference to the first coding mode.

In the examples of the two coding modes above, a collocation relation between the index string of 6 bits, the code string of 20 bits, the low 23 bits of the destination address field and the frame length difference of 3 bits is preferable, such that not only an information expression capability of the multicast data frame can be enhanced as much as possible, but also a risk of information transmission failure due to UDP data packet loss during the transmission process can be reduced.

A Third Coding Mode

In the third coding mode, the code string in the coding unit is directly expressed in a destination address field of an information frame to which the code string belongs, for example, occupying low 20 bits of the destination address field, and the index string is expressed in a difference of frame lengths of an information frame to which the index string belongs and the reference frame. If a length of the index string is maintained as 6 bits as in the above example, a range of the difference of the frame lengths of the information frame and the reference frame should be maintained in a maximum range which can be expressed by binary codes of 6 bits. If the bits of the index string are reduced to 3 bits and the code string is extended to 23 bits such that the code string occupies the whole editable region of the destination address field, the information expression capability is weaker than that in the above example since the index string can only express 8 groups of data.

A Fourth Coding Mode

Similar to the third coding mode, the index string in the coding unit may be expressed in a destination address field of an information frame to which the index string belongs, for example occupying low 23 bits of the destination address field, and the code string is fully expressed in the difference of frame lengths of an information frame to which the code string belongs and the reference frame. If the length of the code string is maintained as 20 bits in the above example, a range of the difference of the frame lengths of the information frame and the reference frame should be maintained as a maximum range which can be expressed by binary codes of 20 bits similarly. If the bits in the code string are reduced to 3 bits described in the above example, an information volume expressed by a single code string is limited; and the index string has 23 bits, and thus multiple multicast data frames are to be constructed to transmit the same information. It follows that, the first and second coding modes are superior to the third and fourth coding modes.

According to the four coding modes described above, it can be known that for the information frame finally constructed by the information frame constructing module 13, whose destination address field particularly refers to the editable bit region in the field, includes a first part content of the coding unit. The first part of content may be all or a part of sub code strings of the code string, or may be all or a part of sub index strings of the index string. The length of the frame body field is adjusted, such that a difference of frame lengths of the information frame and the reference frame is within a specific range. A binary format of the difference includes a remaining part of content in the coding unit which is not coded into the destination address field, and the type and the number of the remaining part of content depends on the type and the number of expression of the destination address field. The remaining part of content may be sub code strings in a remaining part of the code string, may be the whole code string, or may be the whole index string or a remaining part of the index string. In summary, the code string and the index string included in the same coding unit can be expressed separately in the editable bit region of the destination address field of the same information frame and in the difference of frame lengths of the information frame and the reference frame, thereby constructing the information frame.

The signal transmission module 14 is configured to transmit the reference frame and the information frame.

The reference frame and the information frame are constructed, and thus all coding of the information to be transmitted is completed. In this case, a corresponding interface is called by the signal transmission module 14, and the reference frame and the information frame can be radiated in the air in a wireless manner to transmit to a receiving end, by using a WiFi communication component based on the 802.11 protocol. It should be noted that, since the upper layer protocol is UDP, the reference frame and the information frame are transmitted in a form of UDP data packets. The UDP protocol is unreliable, therefore 10 times of cycle are set when the reference frame and the information frame are to be transmitted by the signal transmission module 14. In each cycle, the reference frame and the information frame are transmitted sequentially in an index order indicated by the index string (the reference frame is regarded as coding into 0 and ranking first), such that the receiving end receives all the multicast data frames smoothly. However, the reference frame and the information frame may be transmitted out of order in the same cycle, which does not influence an implementation result of the present disclosure. It should be noted that, the number of times of cyclically sending during the transmission is not limited, which may be 5, 20 or other numbers.

It can be seen that, with the intelligent control terminal described above, the coding process is simple, the information expression capability is strong, and the information can be transmitted without establishing a stable connection between intelligent devices.

Accordingly, at another end corresponding to the intelligent control terminal, a controlled intelligent device is provided according to the present disclosure, such as an intelligent camera, an automobile data recorder and an intelligent watch and so on. The controlled intelligent device is to complete its configuration based on the information to be transmitted described above, so as to access to an external network. In order to receive the information described above, the controlled intelligent device needs to have a function of decoding the multicast data frame constructed by the coding process described above, to perform subsequent operations.

Figure 6:
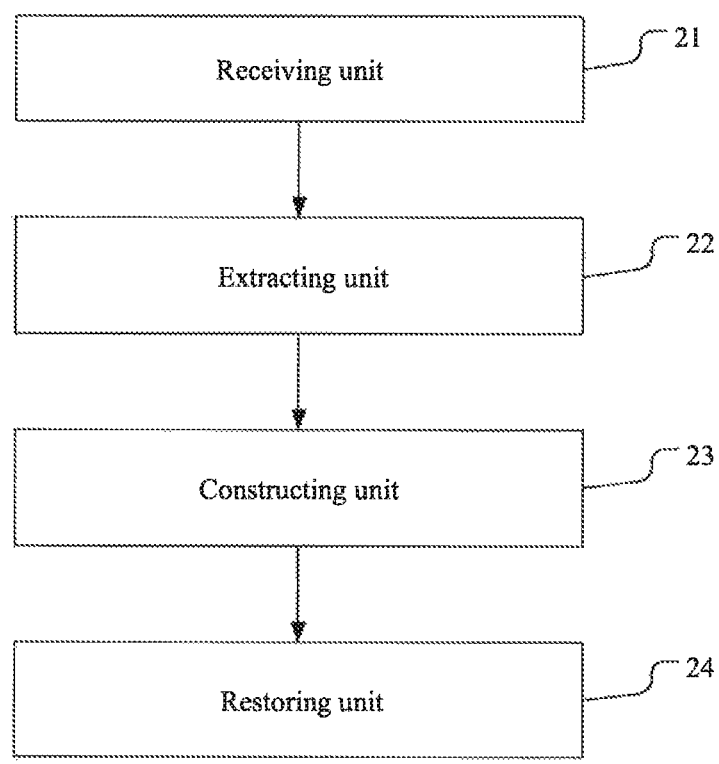
FIG. 6 is a schematic structural diagram of an intelligent device according to the present disclosure.

Referring to FIG. 6, an intelligent device further provided according to the present disclosure includes: a receiving module 21, an extracting module 22, a constructing module 23 and a restoring module 24. Functions of the modules are described in detail hereinafter.

The receiving module 21 is configured to receive a reference frame and an information frame constructed based on a multicast data frame format.

The intelligent device receives UDP data packets in the air via a WiFi communication module complying with the 802.11 standard to obtain a corresponding multicast data frame via the receiving module 21, and then decodes the multicast data frame to obtain information loaded in the multicast data frame.

The reference frame and the information frame are constructed according to a specific coding principle, therefore decoding is to be performed according to a principle corresponding to the coding principle. The decoding party and the coding party in the present disclosure each should comply with the same set of self-defined protocols specified in the present disclosure. In view of this, with reference to the decoding process described above, the receiving module 21 of the intelligent device obtains the reference frame and the information frame by performing corresponding functions according to the following steps.

In step S211, a multicast data frame is received. A UDP data packet radiated in the air in a wireless manner is acquired via a WiFi communication module, to obtain a multicast data frame, and a type of the multicast data frame is identified.

In step S212, it is determined whether the multicast data frame is the reference frame. Specifically, according to the self-defined protocol to be complied in the present disclosure, it is checked whether an editable bit region of a destination address field of the multicast data frame complies with standards of the protocol. For example, in the above method, 23 bits defined each are 0 or 1. Further, it is checked whether a frame length of the multicast data frame meets data specified in the protocol. Since the frame length of the multicast data frame depends on only a length of a frame body field, it may also be checked whether the length of the frame body field meets data specified in the protocol. If one or all of the conditions meet the standards of the self-defined protocol, the multicast data frame is determined as the reference frame; otherwise, the packet may be discarded temporarily.

In step S213, when the multicast data frame is determined as the reference frame in step S212, it is indicated that remaining parts of the currently received series of multicast data frames include information frames. Therefore, it starts to receive remaining multicast data frames, i.e., the information frame. The transmitting party sends the reference frame and the information frame for multiple times, therefore in step S213, when the reference frame is determined, all of the remaining multicast data frames may be received, and repeated multicast data frames may be discarded, thereby obtaining the reference frame and non-repeated information frames finally. Theoretically, in the above embodiment, since the index string has 6 bits, a sum of bits of the reference frame and the information frame should be 64, which depends on bits of the index string. Further, it can be checked whether all non-repeated information frames and the reference frame are received according to the number of data sets and an order indicated by the index string, and the remaining frames are discarded. Further, it can be determined whether the information frame is an information frame loading the information to be transmitted defined in the present disclosure by checking whether a difference of frame lengths of the information frame and the reference frame exceeds a predetermined specific range. Therefore, in step S213, a frame check process is performed substantially. In addition, corresponding to several different examples of the intelligent control terminal, the frame length of the information frame is obviously greater or less than the frame length of the reference frame (specified by the self-defined protocol), that is, the frame length of the reference frame is less than or greater than the frame length of the information frame, therefore it can be checked whether the multicast data frame is the information frame complying with standards of the self-defined protocol based on the feature.

It follows that, the receiving module 21 can receive all the reference frames and information frames transmitted by the transmitting party by performing the above steps.

The extracting module 22 is configured to extract a first part of content of a coding unit expressed by a destination address field of the information frame, and determine a remaining part of content of the coding unit based on a difference of frame lengths of the information frame and the reference frame, to obtain the whole coding unit.

The substantial function of the extracting module 22 is to perform a part of decoding process, so as to acquire the relatively independent coding unit in each information frame.

A receiving party (the intelligent devices) needs to comply with the coding principle of the transmitting party. Therefore, corresponding to the four coding modes for the intelligent control terminal, the received information frame is decoded by the extracting module 22 according to the following modes.

A First Decoding Mode

An index string (previous 6 bits) and a first sub code string of a code string (last 17 bits) are extracted from an editable bit region of the destination address field of the information frame, i.e., lower 23 bits of the destination address field. Then, a binary difference (3 bits) of frame lengths (or frame body field lengths) of the information frame and the reference frame, i.e., a second sub code string, is calculated. The first sub code string is concatenated with the second sub code string to form the code string, and the index string is used to determine a splicing order of code strings according to an order indicated by the index string. The obtained code string and index string form the coding unit loaded in the information frame.

A Second Decoding Mode

Similarly, a whole code string (low 20 bits) and a first sub index string of an index string (previous 3 bits of an editable bit region) are extracted from an editable bit region of a destination address field of the information frame, i.e., lower 23 bits of the destination address field. A second sub index string of the index string is determined based on a binary difference (3 bits) of frame lengths (or frame body lengths) of the information frame and the reference frame. The first sub index string is spliced with the second sub index string to obtain the whole index string. The index string and the code string form the coding unit expressed by the information frame.

A Third Decoding Mode

The editable bit region of the destination address field of the information frame, totally 23 bits, is directly extracted to obtain the code string. The index string is directly determined as a binary difference (3 bits or more) of frame lengths (or frame body field lengths) of the information frame and the reference frame. The index string and the code string form the corresponding coding unit.

A Fourth Decoding Mode

Similar to the third decoding mode, the editable bit region of the destination address field of the information frame, totally 23 bits, is directly extracted to obtain the index string. The code string is directly determined as a binary difference (3 bits or more) of frame lengths (or frame body field lengths) of the information frame and the reference frame. The index string and the code string form the corresponding coding unit.

It follows that, a protocol corresponding to the coding process should be complied regardless of the details of the functions performed by the extracting module 22. Specifically, a first part of content of the coding unit expressed by the destination address field of the information frame is extracted from the information frame, and a remaining part of content of the coding unit is determined based on a difference of frame lengths (a binary format of a defined length) of the information frame and the reference frame, thereby obtaining the whole coding unit.

When all the information frames are decoded into the coding units, primary decoding for the information is completed. Subsequently, the splicing and restoring are performed to obtain the corresponding information.

The constructing module 23 is configured to splice code strings included in all the obtained coding units in an order indicated by index strings of the coding units to generate a coding sequence.

Each coding unit has an index string indicating an order, and the index string indicates a position of a code string included in the coding unit in the split coding sequence. Therefore, code strings included in the coding units are spliced in an order indicated by the index strings, to restore a corresponding coding sequence, thereby restoring the information to be transmitted.

The restoring module 24 is configured to restore the coding sequence into information.

As described above, if the coding sequence is obtained by converting a cipher text which is generated by encrypting information, the coding sequence is to be restored into the cipher text firstly, and then the cipher text is decrypted with a pre-stored secret key to obtain the transmitted information. A type of the secret key is determined depending on whether the encryption technology is public key encryption or symmetric encryption. For the public key encryption, a pre-stored secret key corresponding to the public key for the coding is used to decrypt. For the symmetric encryption, a pre-stored secret key the same as the secret key for the coding is used to decrypt. Practically, the processing is unnecessary if the coding sequence is obtained by converting non-encrypted information.

Further, for the information, during the coding process, multiple information elements are combined according to a certain format and converted into a coding sequence. For example, it is assumed that content formed by performing ASCII conversion on the restored information is as follows:

SSID:MYWiFi|PSW:PLZLOGIN.

It can be seen that, SSID and PSW indicate types of information elements, MYWiFi and PLZLOGIN indicates specific content of the information elements, an attribute separator, i.e., ":", is used to separate the type identifier from the specific content, and an element separator "|" is used to separate different information elements. According to the above principle, the intelligent control terminal and the intelligent device can convert and interpret information based on the standards of the self-defined protocol, such that the intelligent device can configure its network setting and access to a network.

It should be noted that, steps performed by the receiving module 21 and the extracting module 22 are not limited to be performed in the order after all tasks are completed, and steps performed by the two modules may be performed sequentially for each received information frame. Therefore, the steps performed by the two modules may be performed in parallel, that is, steps are performed by the receiving module 21 and the extracting module 22 for each information frame, instead of performing by the extracting module 22 for all information frames after performing by the receiving module 21 for all information frames. A person skilled in the art should know the mechanism.

It follows that, corresponding to the above intelligent control terminal, with the intelligent device according to the present disclosure, information loaded by the multicast data frame can be extracted by simple processes without establishing a stable connection between the receiving party and the transmitting part.

In an application scene as reference, an intelligent control terminal implementing the multicast transmission method for the information to be transmitted according to the present disclosure and an intelligent device implementing the information extracting method for the multicast data frame according to the present disclosure are provided. In a case that the intelligent control terminal and the intelligent device do not access to a specific WiFi access point and no stable direct connection between the intelligent control terminal and the intelligent device is established by AD-Hoc or WiFi Direct, the user may select or input information such as an SSID and a password and so on of a WiFi access point which allows the intelligent device to access, by operating the intelligent control terminal, and determine to transmit the information. The intelligent control terminal codes the information into a multicast data frame by using the solution according to the present disclosure, and a radio signal is transmitted in the air by a WiFi communication module included in the intelligent control terminal. At an intelligent device side, the intelligent device receives the radio signal by the WiFi communication module, identifies the multicast data frame from the radio signal by using the solution according to the present disclosure, determine the reference frame and the information frame, decode the transmitted information by using the reference frame and the information frame, and finally obtains the configuration information such as corresponding SSIDs and passwords from the information. The intelligent device configures its network setting based on the configuration information, starts to access to a WiFi access point specified by the SSID, and finally the intelligent device accesses to the WiFi access point.

In summary, the information is transmitted by using the multicast data frame according to the present disclosure without establishing a connection between the transmission two parties in advance, such that the communication process is simplified and quick and efficient communication can be performed between the devices.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components of the multicast transmission method and device for information to be transmitted or the information extraction method and device for the multicast data frame according to the embodiments in the disclosure in practice. The disclosure can also realize one part of or all devices or system programs (for example, computer programs and computer program products) used for carrying out the method described here. Such programs for realizing the disclosure can be stored in computer readable medium, or can possess one or more forms of signal Such signals can be downloaded from the Internet website or be provided at signal carriers, or be provided in any other forms.

Figure 7:
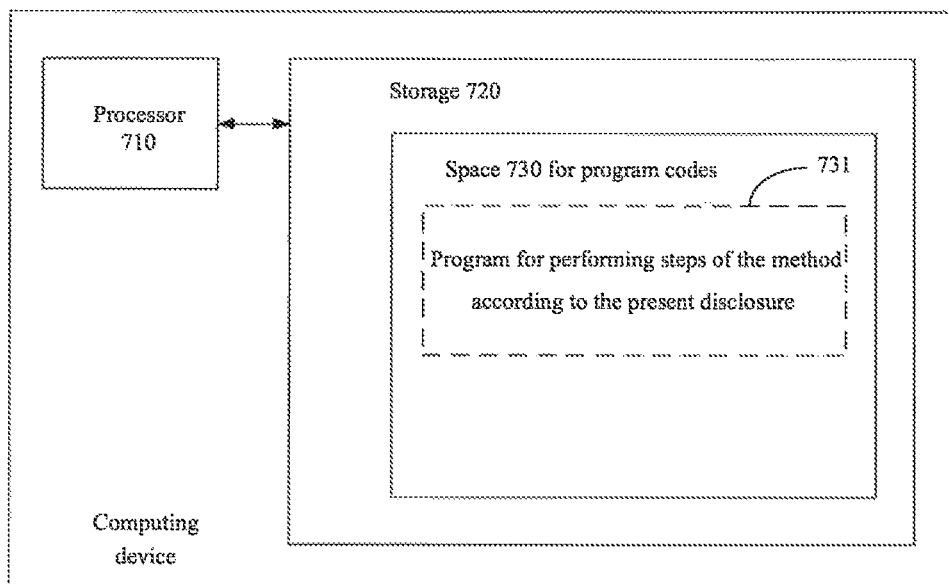
FIG. 7 schematically shows a block diagram of a computing device for implementing the method according to the present disclosure.
Figure 8:
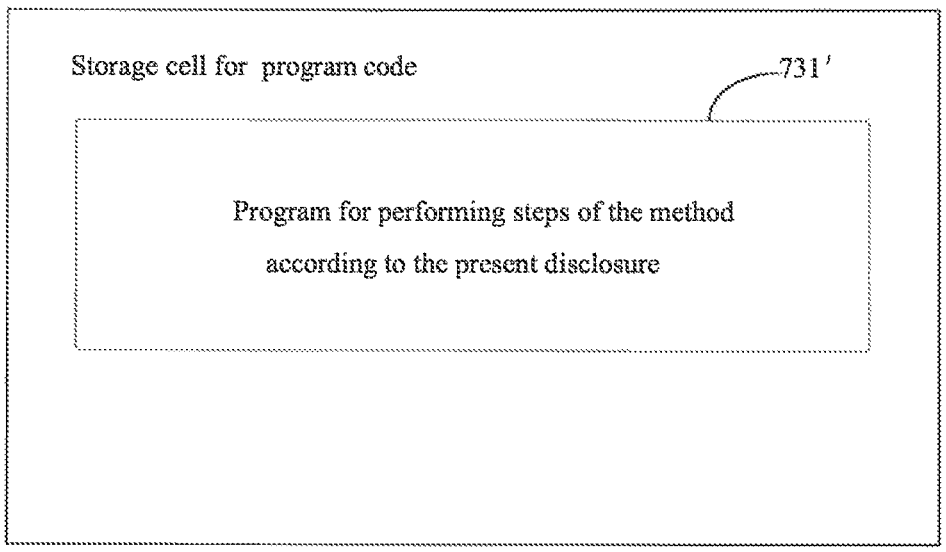
FIG. 8 schematically shows a storage cell configured to maintain or carry program codes for implementing the method according to the present disclosure.

For example, FIG. 7 shows a computing device which can implement the multicast transmission method for information to be transmitted or the information extraction method for the multicast data frame according to the present disclosure. The computing device traditionally comprises a processor 710 and a computer program product in the form of storage 720 or a computer readable medium. The storage 720 can be electronic storage such as flash memory, EEPROM (Electrically Erasable Programmable Read-Only Memory), EPROM, hard disk or ROM, and the like. The storage 720 possesses storage space 730 for carrying out program code 731 of any steps of aforesaid method. For example, storage space 730 for program code can comprise various program codes 731 used for realizing any steps of aforesaid method. These program codes can be read out from one or more computer program products or write in one or more computer program products. The computer program products comprise program code carriers such as hard disk, Compact Disc (CD), memory card or floppy disk and the like. These computer program products usually are portable or fixed storage cell as said in FIG. 8. The storage cell can possess memory paragraph, storage space like the storage 720 in the computing device in FIG. 7. The program code can be compressed in, for example, a proper form. Generally, storage cell comprises computer readable code 731', i.e. the code can be read by processors such as 710 and the like. When the codes run on a computer device, the computer device will carry out various steps of the method described above.

The "an embodiment", "embodiments" or "one or more embodiments" referred here mean being included in at least one embodiment in the disclosure combining specific features, structures or characteristics described in the embodiments. In addition, please note that the phrase "in an embodiment" not necessarily mean a same embodiment.

A lot of details are illustrated in the specification provided here. However, it should be understood that the embodiments of the disclosure can be practiced without the specific details. In some embodiments, a known method, structure and technology are not illustrated in detail, in order to not obscure understanding for the specification.

It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The disclosure can be realized by means of hardware comprising several different elements and by means of properly programmed computer. In the unit claims several devices are listed, several of the systems can be embodied by a same hardware item. The use of words first, second and third does not mean any sequence. These words can be explained as name.

In addition, it should be noticed that the language used in the disclosure is chosen for the purpose of readability and teaching, instead of for explaining or limiting the topic of the disclosure. Therefore, it is obvious for a person skilled in the art to make a lot of modification and alteration without departing from the scope and spirit of the appended claims. For the scope of the disclosure, the disclosure is illustrative instead of restrictive. The scope of the disclosure is defined by the appended claims.

What is claimed is:

1. A multicast transmission method for information to be transmitted, comprising:
dividing a coding sequence of information to be transmitted into a plurality of code strings, and defining each code string and an index string allocated to the code string indicating an index order as a coding unit;

constructing a reference frame based on a multicast data frame format;
constructing an information frame based on the multicast data frame format, such that a destination address field of the information frame comprises a first part of content of the coding unit and a difference of frame lengths of the information frame and the reference frame comprises a remaining part of content of the coding unit; and
transmitting the reference frame and the information frame,
wherein the destination address field of the reference frame provides an encodable bit region, respective bits in the encodable bit region are set as 0 or 1, and the frame length of the reference frame is set to be less than the frame length of the information frame, or the frame length of the information frame is set such that a difference between frame lengths of the information frame and the reference frame is within a specific range.

2. The method according to claim 1, wherein a length of the coding unit is defined as a total length, the index string occupies a first length, the code string occupies a second length, and the total length is a sum of the first length and the second length.

3. The method according to claim 2, wherein the coding string comprises a first sub code string concatenated with the index string and expressed by a destination address field of an information frame to which the first sub code string belongs, and a second sub code string expressed by a difference of frame lengths of an information frame to which the second sub code string belongs and the reference frame.

4. The method according to claim 2, wherein the index string comprises a first sub index string concatenated with the code string and expressed by a destination address field of an information frame to which the first sub index string belongs, and a second sub index string expressed by a difference of frame lengths of an information frame to which the second sub index string belongs and the reference frame.

5. The method according to claim 2, wherein the code string is expressed by a destination address field of an information frame to which the code string belongs, and the index string is expressed by a difference of frame lengths of an information frame to which the index string belongs and the reference frame.

6. The method according to claim 2, wherein the index string is expressed by a destination address field of an information frame to which the index string belongs, and the code string is expressed by a difference of frame lengths of an information frame to which the code string belongs and the reference frame.

7. The method according to claim 1, wherein the destination address field of the information frame provides an encodable bit region for expressing the coding unit, and the encodable bit region is arranged to be close to low bits of an actual byte length of the destination address field.

8. An intelligent control terminal, comprising:
at least one processor; and
a memory communicably connected with the at least one processor for storing instructions executable by the at least one processor, wherein execution of the instructions by the at least one processor causes the intelligent control terminal to:
divide a coding sequence of information to be transmitted into a plurality of code strings, and define each code string and an index string allocated to the code string indicating an index order as a coding unit;
construct a reference frame based on a multicast data frame format;
construct an information frame based on the multicast data frame format, such that a destination address field of the information frame comprises a first part of content of the coding unit and a difference of frame lengths of the information frame and the reference frame comprises a remaining part of content of the coding unit; and
transmit the reference frame and the information frame;
wherein the destination address field of the reference frame provides an encodable bit region, respective bits in the encodable bit region are set as 0 or 1, and the frame length of the reference frame is set to be less than the frame length of the information frame, or the frame length of the information frame is set such that a difference between frame lengths of the information frame and the reference frame is within a specific range.

9. The intelligent control terminal according to claim 8, wherein a length of the coding unit is defined as a total length, the index string occupies a first length, the code string occupies a second length, and the total length is a sum of the first length and the second length.

10. The intelligent control terminal according to claim 9, wherein the code string comprises a first sub code string concatenated with the index string and expressed by a destination address field of an information frame to which the first sub code string belongs, and a second sub code string expressed by a difference of frame lengths of an information frame to which the second sub code string belongs and the reference frame.

11. The intelligent control terminal according to claim 9, wherein the index string comprises a first sub index string concatenated with the code string and expressed by a destination address field of an information frame to which the first sub index string belongs, and a second sub index string expressed by a difference of frame lengths of an information frame to which the second sub index string belongs and the reference frame.

12. The intelligent control terminal according to claim 9, wherein the code string is expressed by a destination address field of an information frame to which the code string belongs, and the index string is expressed by a difference of frame lengths of an information frame to which the index string belongs and the reference frame.

13. The intelligent control terminal according to claim 9, wherein the index string is expressed by a destination address field of an information frame to which the index string belongs, and the code string is expressed by a difference of frame lengths of an information frame to which the code string belongs and the reference frame.

14. The intelligent control terminal according to claim 8, wherein the destination address field of the information frame has an encodable bit region for expressing the coding unit, and the encodable bit region is arranged to be close to low bits of an actual byte length of the destination address field.

15. The intelligent control terminal according to claim 8, wherein the destination address field of the reference frame has an encodable bit region, respective bits in the encodable bit region are set as 0 or 1, and the frame length of the reference frame is set to be less than a frame length of the information frame.

16. The intelligent control terminal according to claim 8, wherein the frame length of the information frame is set such that a difference of frame lengths of the information frame and the reference frame is within a specific range.

17. A non-transitory computer readable medium, having computer programs stored thereon that, when executed by one or more processors of a computing device, cause the computing device to perform operations for multicast transmission of information to be transmitted, the operations comprising:
- dividing a coding sequence of information to be transmitted into a plurality of code strings, and defining each code string and an index string allocated to the code string indicating an index order as a coding unit;
- constructing a reference frame based on a multicast data frame format;
- constructing an information frame based on the multicast data frame format, such that a destination address field of the information frame comprises a first part of content of the coding unit and a difference of frame lengths of the information frame and the reference frame comprises a remaining part of content of the coding unit; and
- transmitting the reference frame and the information frame;
- wherein the destination address field of the reference frame provides an encodable bit region, respective bits in the encodable bit region are set as 0 or 1, and the frame length of the reference frame is set to be less than the frame length of the information frame, or the frame length of the information frame is set such that a difference between frame lengths of the information frame and the reference frame is within a specific range.

* * * * *